Jan. 12, 1954     B. R. THIELE     2,665,576

DOMESTIC LAUNDERING MACHINE

Filed March 24, 1949     7 Sheets-Sheet 1

Fig.1

INVENTOR
Berthold R. Thiele
By Carlson, Pitzner, Hubbard & Wolfe
ATTORNEYS

Jan. 12, 1954

B. R. THIELE

2,665,576

DOMESTIC LAUNDERING MACHINE

Filed March 24, 1949

INVENTOR
Berthold R. Thiele
ATTORNEY

Jan. 12, 1954     B. R. THIELE     2,665,576

DOMESTIC LAUNDERING MACHINE

Filed March 24, 1949     7 Sheets-Sheet 3

INVENTOR
Berthold R. Thiele

B. R. THIELE

2,665,576

DOMESTIC LAUNDERING MACHINE

Filed March 24, 1949

INVENTOR
Berthold R. Thiele
By Carlson, Pitzner, Hubbard & Wolfe
ATTORNEY

Patented Jan. 12, 1954

2,665,576

UNITED STATES PATENT OFFICE 2,665,576

DOMESTIC LAUNDERING MACHINE

Berthold R. Thiele, Ripon, Wis., assignor to Speed Queen Corporation, Ripon, Wis., a corporation of Delaware Application March 24, 1949, Serial No. 83,252

10 Claims. (Cl. 68—23)

1

The invention relates to domestic laundering machines generally and is more particularly concerned with machines of the type in which washing, rinsing and extracting operations are performed in the same receptacle.

One object of the invention is to provide a laundering machine of the above general character having nested inner and outer receptacles in which the clothes to be laundered are placed in the inner receptacle and suitably agitated during the washing and rinsing phases of the operating cycle, and in which the extracting action is effected by rotation of both receptacles at relatively high speed.

Another object is to provide an improved driving arrangement for rotating the clothes receptacle to extract moisture from the clothes, which arrangement facilitates uniform distribution of the clothes in the receptacle before the latter reaches full extracting speed and which automatically counterbalances any inequalities of the distribution of the clothes that may occur so that vibration is reduced to a minimum while the receptacle is rotating at extracting speed.

A further object is to provide a laundering machine having inner and outer receptacles, one of which is rotatably driven at high speed by the other through novel coupling means which insures smooth substantially vibrationless running of the receptacles and which materially reduces the strains on the drive mechanism of the machine.

Another object is to provide a laundering machine of the above type in which the coupling of the receptacles is effected through the medium of a column of liquid retained in the outer receptacle in cooperation with elements carried by the inner receptacle.

A further object is to provide a laundering machine embodying novel features of construction whereby the clothes receptacle is automatically connected with and disconnected from the main drive shaft of the machine in accordance with the amount of liquid in the machine.

Still another object is to provide a laundering machine in which washing, rinsing and extracting operations are performed automatically according to a predetermined cycle, which is very simple structurally and which utilizes controls of a very simple character.

Other objects and advantages of the invention will become apparent from the following detailed description of the preferred embodiment illustrated in the accompanying drawings, in which:

Figure 1 is a vertical sectional view of a

2 laundering machine embodying the features of the invention.

Fig. 9 is a fragmentary sectional view showing the application of a balancing chamber to a modified tub and receptacle organization.

For purposes of illustration the improved laundering machine has been shown in a form particularly suitable for use with automatic cycle-controlling mechanism. It will be understood, however, that the invention is not limited to that type of operation, but may be used to advantage in machines arranged for manual or semi-automatic control. It will also be understood that the elements of the machine and their relationship are susceptible of various modifications and alternative constructions, and that I do not intend to limit the invention to the specific form disclosed, but intend to cover all modifications and alternative constructions falling within the spirit and scope of the invention as expressed in the appended claims.

Referring to the drawings, the machine selected to illustrate the invention is a domestic type washing machine having a cylindrical inner receptacle or basket 20 in which the clothes or fabrics to be laundered are placed, and in which they remain throughout the laundering cycle. The basket 20 is open at its upper end and is supported in an upright position within a somewhat larger cylindrical outer receptacle or tub 21 for holding the washing solutions or rinsing liquids. Provision is made for agitating the clothes in the basket 20 in the washing and rinsing phases of the cycle and for rotating the basket at relatively high speed to remove the water from the clothes by centrifugal action in the extracting phase of the laundering cycle.

In the exemplary washing machine shown in Figs. 1-5 of the drawings, the operating elements, including the basket 20, the tub 21 and driving mechanism 22 for agitating the clothes and rotating the basket, are enclosed in a suitable casing or cabinet 23, herein shown as generally rectangular. Preferably, the basket and tub are located in the upper part of the cabinet and access thereto is provided by an opening 24 in the top of the cabinet, which is fitted with a removable cover 25. Support for the operating elements of the machine is provided by a supporting structure including a pair of cross members 26, herein shown as elongated flat plates arranged in vertical edgewise position and flanged at opposite ends for attachment to the walls of the cabinet.

In the particular cabinet illustrated, a compartment or tank 27 (Fig. 2) is provided for temporarily storing the washing solution so that it may be used in a series of washing operations. The tank 27 in this instance is located in the lower part of the cabinet and at one side thereof so that the washing solution may be transferred from the tub 21 by gravity flow. A pump 28 is provided for returning the washing solution from the tank to the tub. An additional tank or tanks for storing rinsing water or other liquids may be installed in the base of the cabinet opposite the tank 27 if desired, leaving a compartment in the central part of the cabinet for the accommodation of the drive mechanism 22. It will be understood that one or more of the side walls of the cabinet may be constructed as removable panels to provide access to the drive mechanism.

Agitation of the clothes in the basket 20 for washing and rinsing and spinning for extraction is effected by the drive mechanism 22 through the medium of an upright drive shaft 30 associated with the basket 20 and the tub 21 in a novel manner to be described in detail hereinafter. The shaft 30 is supported for rotation about a vertical axis by antifriction bearings 31 seated in a bearing sleeve 32 suitably secured to the cross members 26 generally centrally of the cabinet 23. The upper end of the shaft projects through a central opening in the tub 21 and the lower end is extended below the bearing sleeve 32 for connection with the drive mechanism 22. This mechanism includes a driving motor M, which may be of any preferred type, and is herein shown as an electric motor. The motor is secured to a mounting plate 35 adjustably supported on a bracket 36 depending from the cross members 26.

Preferably, the drive mechanism 22 includes two driving elements selectively operable for rotating or oscillating the shaft 30. As herein shown these elements are driven from a pulley 37 fast on the lower end of the vertically disposed shaft of the motor M and drivingly connected by a V-belt 38 with a pulley 39 keyed or otherwise fixedly mounted on an upright shaft 40. The shaft 40 in this instance constitutes the drive shaft of a transmission 41 supported from the cross member 26 by a depending bracket 42.

The transmission 41 may be of any preferred type, as, for example, that commonly used in washing machines wherein suitable gearing enclosed within a housing 43 is operative in response to the continuous unidirectional rotation of the shaft 40 to rotate a terminal gear 44 alternately in opposite directions through one or several revolutions or fractions thereof. In the present instance, the terminal gear 44 constitutes the driving element for oscillating the shaft 30 and for this purpose it is rotatably supported on an extension 45 of the shaft which projects through the housing 43 and is journaled at its lower end in a bearing 46 seated in a boss formed in the housing.

Provision is made for drivingly coupling the gear 44 with the shaft 30 when the latter is to be oscillated. For this purpose the gear is formed at its upper end with radially directed clutch teeth 47 engageable by a clutch sleeve 48 splined to and axially slidable on a clutch element 49 rigidly secured to the shaft extention 45.

Shifting of the clutch sleeve 48 into or out of driving engagement with the clutch teeth 47 of the gear 44 is effected by a forked shifter arm 50 pivotally supported on ears 51 struck up from the bracket 42. A spring 52 acting on a depending lever arm 53 rigid with the shifter arm 50 normally acts to retain the clutch sleeve in a raised or disengaged position. In the exemplary machine a solenoid 54 is provided for rocking the shifter arm against the tension of the spring 52 to shift the clutch sleeve to engaged position.

Figure 1:
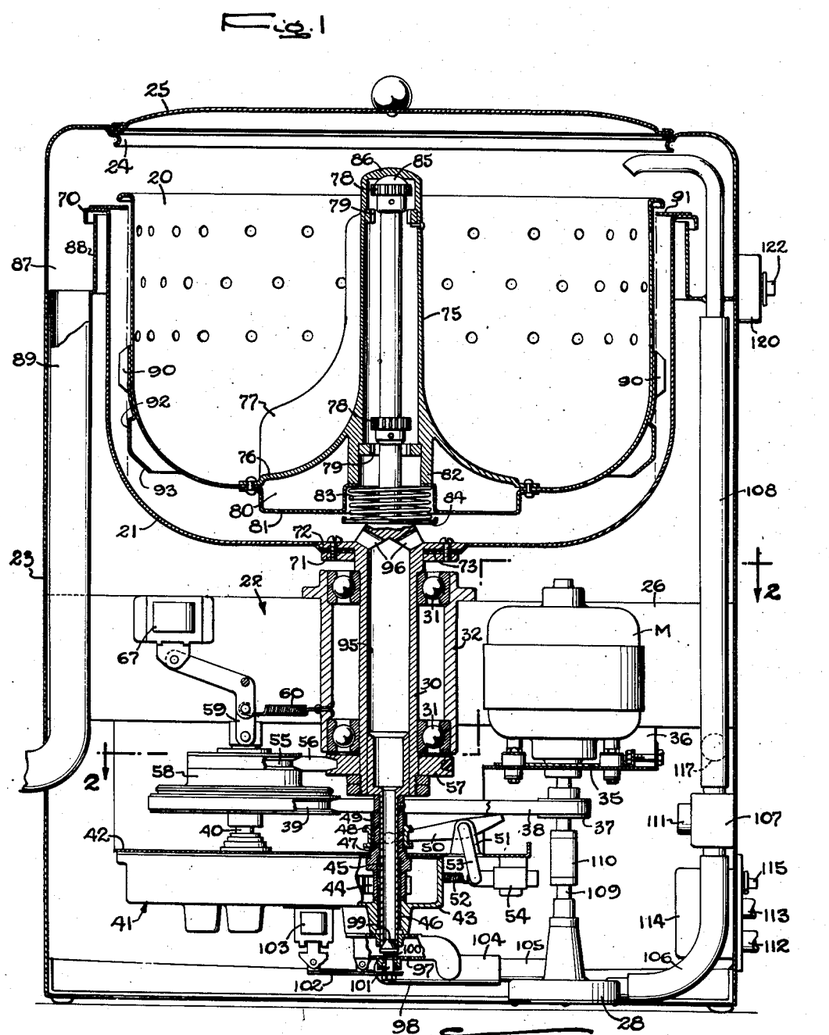
Figure 2:
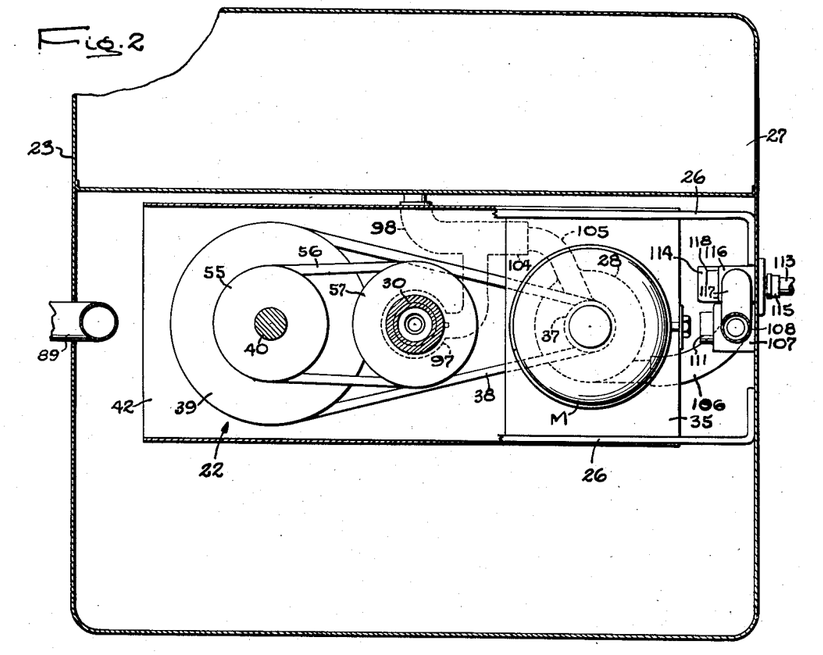
Fig. 2 is a sectional view of the machine taken in offset horizontal planes substantially on the line 2—2 of Fig. 1.

The drive element for imparting continuous rotation to the main shaft 30 comprises a pulley 55 rotatably supported on the shaft 40 above the pulley 39 and drivingly connected by a V-belt 56 with a pulley 57 keyed to the shaft 30 immediately below the bearing sleeve 32. By means of a clutch enclosed within a housing 58 the pulley 55 may be drivingly coupled with or uncoupled from the continuously driven pulley 39. As shown in Fig. 1, the clutch is actuated by a link 59 which is normally biased to a disengaged position by a spring 60. A solenoid 67 supported on one of the cross members 26 is arranged to actuate the link 59 to engage the clutch with the driving pulley when the shaft 30 is to be rotated.

Oscillation of the drive shaft 30 is utilized to agitate the clothes for washing and rinsing, in this instance by oscillating the basket 20. It will be appreciated, however, that an agitator separate from the basket may be employed for that purpose if desired.

In accordance with the invention, high speed rotation or spinning of the basket 20 is effected through the medium of a novel drive connection with the tub 21, which is arranged to be positively driven from the shaft 30. The drive connection is preferably in the form of a fluid coupling which affords smooth, even acceleration of the basket to spinning speed and which lends itself particularly well to a novel organization of the tub and basket structure for counterbalancing any nonuniform distribution of the load in the basket, thereby minimizing vibration of the structure when rotated at high speed. As to the latter aspect of the invention, it has been found that the counterbalancing is so effective that no special base is required for the machine and it does not have to be anchored in place, as is necessary with other machines employing a spinning basket.

As will be seen by reference to Fig. 1 of the drawings, the tub 21 comprises a generally cylindrical shell of sheet metal or the like having at its upper edge an outwardly and downwardly turned flange 70. As indicated heretofore, the bottom wall of the tub, which is integral with the cylindrical shell, is formed with a central opening for the accommodation of the shaft 30. The tub is rigidly secured to the shaft by clamping the marginal edge portion of the bottom wall around the opening between a clamping ring 71 and a circumferential flange 72 on the shaft. A gasket 73 is interposed in the joint thus formed to prevent leakage from the tub.

The basket 20 is of the same general shape as the tub 21, but of smaller diameter so that it may be nested therein. It is preferably in the form of a generally cylindrical sheet metal shell having its lower edge portion turned inwardly to form a part of the bottom wall of the basket. Centrally disposed within the basket is an upright tubular pedestal 75 opening at its lower end for the reception of the shaft 30. In the particular basket shown in Fig. 1 of the drawings, the pedestal 75 is formed at its lower end with an outwardly flaring skirt 76 suitably connected at its marginal edge with the bottom-forming portion of the shell to complete the bottom of the basket. A series of blades or vanes 77 projecting radially from the pedestal 75 assist in agitating the clothes when the basket is oscillated.

Figure 3:
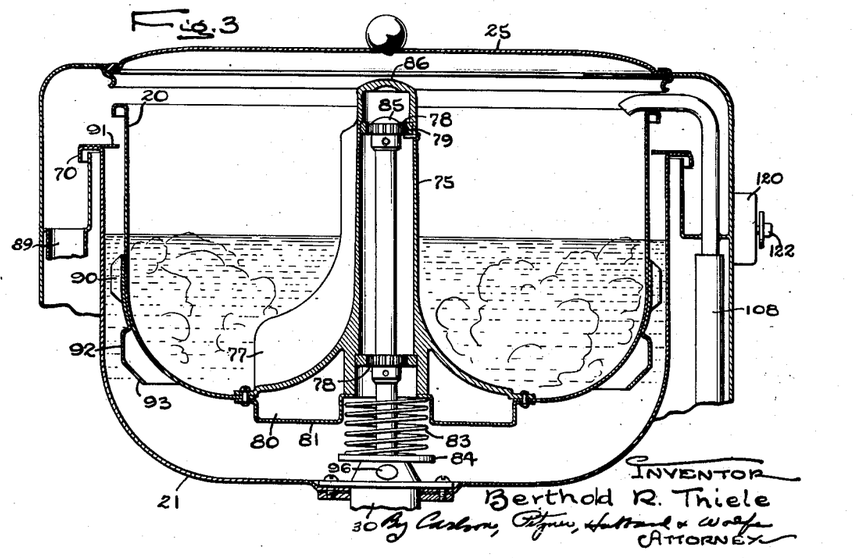
Fig. 3 is a fragmentary vertical sectional view of the machine showing the clothes receptacle in the position occupied in the washing phase of the operating cycle.

The pedestal 75 cooperates with the shaft 30 to support the basket in the extracting or spinning phase of the operating cycle and to provide a driving connection between the shaft and the basket for oscillating the latter in the washing and rinsing phases of the cycle. Novel clutch means is provided whereby such driving connection is established and interrupted automatically in accordance with the position of the basket with respect to the shaft. More particularly, cooperating clutch elements 78 and 79 are provided respectively on the shaft and on the pedestal positioned so as to engage upon movement of the basket to the raised position in which it is shown in Fig. 3, and to disengage upon movement of the basket to the lowered position in which it is shown in Fig. 1. As herein shown the clutch elements 78 have external clutch teeth and the elements 79 have internal clutch teeth shaped and spaced apart for intermeshing engagement.

Preferably movement of the basket 20 to clutch-engaging position is effected by the introduction of liquid into the tub 21 to float the basket from its normal rest position. While the basket may be rendered sufficiently buoyant for that purpose by constructing it with an imperforate shell, it is preferable to provide it with a separate float chamber 80 so that the walls may be perforated to facilitate drainage.

In the exemplary embodiment illustrated in Figs. 1–5, the float chamber 80 is formed by an annular member 81 of sheet metal or other suitable material generally channel-shaped in cross section and having its outer marginal edge portions flanged for attachment to the bottom wall of the basket shell at the junction of the latter with the pedestal skirt 76. The inner marginal edge of the member 81 is also flanged and is secured in abutting relation to a depending cylindrical extension 82 of the pedestal. With this arrangement the skirt portion of the pedestal, the member 81 and the extension 82 define an air chamber affording ample buoyancy to float the basket and its load when liquid is admitted to the tub 21.

Provision is made for partially counterbalancing the weight of the basket and its load, thereby reducing the size of the float chamber required to raise the basket. The counterbalance means, as shown, comprises a coiled compression spring 83 disposed within the recess formed by the member 81 and interposed between the inner marginal edge of the member and a disk 84 seated against an upwardly facing shoulder formed on the shaft 30. The disk 84 may be formed with an upturned marginal flange for retaining the spring in proper alinement with the cooperating parts.

To support the basket 20 while being rotatably driven by the tub 21, the shaft 30 is formed at its upper end with a bearing 85 adapted to seat in a complemental bearing recess in a cap 86 forming the upper wall of the pedestal 75. The bearing and recess are preferably spherical in contour so that the basket may swing transversely relative to the shaft about a pivot point located on the axis of rotation and adjacent the top or somewhat above the top of the tub 21. This swinging action is utilized to counterbalance an unevenly distributed load, as will be explained presently.

To spin the basket 20, the tub 21 is rotated at high speed. Following a washing or rinsing operation and without draining the water from the tub, the drive mechanism 22 is shifted from oscillating to rotating drive. Because of the weight of the clothes and water, rotation of the tub and basket starts gradually, the latter being driven positively at this time as the clutch elements 78 and 79 are engaged. As the tub accelerates, the water therein is forced outwardly and flows over the rim of the tub. This overflow is received in a channel 87 formed by a partitioning member 88 secured to the inner walls of the cabinet 23 and having an upstanding annular flange encircling the tub and underlying the flange 70 thereof. A drain pipe 89 opening from the bottom of the channel 87 carries off the water to the drain or to a storage tank, if such is provided.

As the water in the tub recedes, the basket 20 moves downwardly until the clutch elements 78 and 79 are disengaged. This occurs while the tub and basket are still rotating at relatively low speed. Thereafter the basket is driven by the tub through a coupling provided by the water remaining therein coacting with vanes or blades 90 projecting radially from the sides of the basket.

In order to retain sufficient water in the tub to effectively drive the basket after disengagement of the clutch elements, an inwardly projecting water retaining ring is provided on the side wall of the tub at a point spaced upwardly from the vanes 90 on the basket. In the machine shown in Fig. 1, the retaining ring is in the form of an annular plate 91 secured to the tub flange 70 and projecting inwardly with respect to the side wall of the tub.

Figure 4:
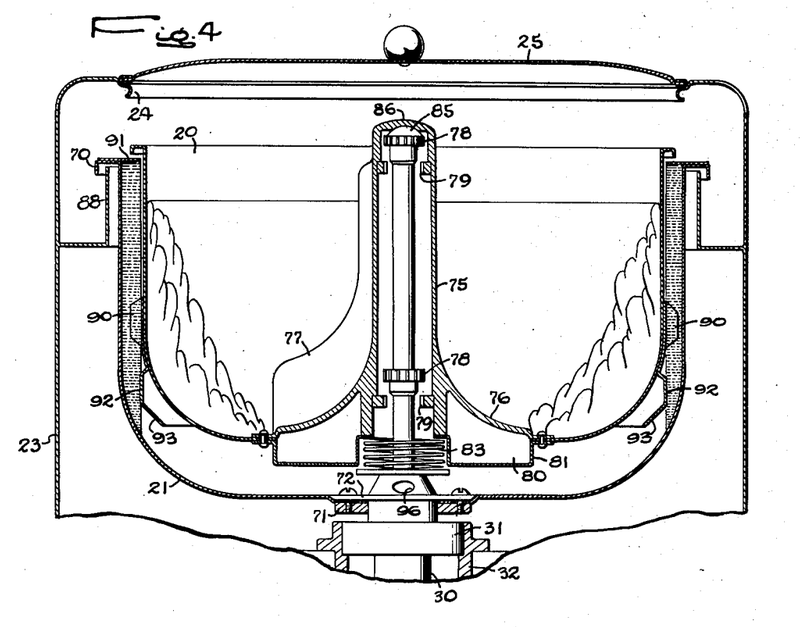
Fig. 4 is a fragmentary sectional view similar to Fig. 3 showing the conditions prevailing in the extracting phase of the operating cycle and with the clothes evenly distributed in the receptacle.

By the time the tub 21 reaches full spinning speed all water is discharged therefrom except that trapped below the ring 91. Due to the centrifugal force involved, this trapped water is retained as a hollow cylindrical column corresponding in thickness to the width of the ring 91 and distributed around the side walls of the tub. The ring 91 and basket are so proportioned that sufficient clearance is afforded to permit centrifugal discharge of water from the basket. The vanes 90, on the other hand, project into the water column, as shown in Fig. 4, to complete the fluid coupling. Since the coupling thus provided is not a positive one, the basket 20 will accelerate at a slower speed than the tub and in a smooth, even manner which materially aids in the uniform distribution of the clothes within the basket. Moreover, when rotation of the tub is interrupted, deceleration of the basket is effected smoothly and evenly without imposing any strains on the basket or on the drive mechanism associated therewith.

Novel means is provided for automatically counterbalancing any uneven load distribution in the basket 20 so as to precisely balance the tub and basket assembly while spinning. Any tendency of the spinning elements to gyrate is therefore effectively eliminated and the assembly may be rotated at high speed without excessive vibration. In the present instance the counterbalancing means utilizes the water column forming a part of the fluid coupling for driving the basket 20. With the basket in rotation, the water forming this column is uniformly distributed around the peripheral wall surface of the tub, thus automatically balancing the same with respect to its axis of rotation.

For cooperation with the water column the basket 20 is provided with a circumferentially disposed balancing ring 92 having an outer diameter such that it either just touches the inner surface of the column as shown in Fig. 4 or penetrates into the inner surface of the column when the basket 20 is accurately centered. In the particular form shown in Figs. 1–4, the balancing ring 92 comprises an annular skirt-like member secured to the wall of the basket below the vanes 90. The lower edge portion 93 of this member is turned inwardly so as to project beyond the inner peripheral surface of the water column at all times. Any water contained within the ring during a washing or rinsing operation is discharged of course as the tub is emptied and when the ring functions as an air chamber during the spinning phase of the cycle, then one-way vents (not shown) will discharge outwardly water that may have been trapped in the chamber.

Figure 5:
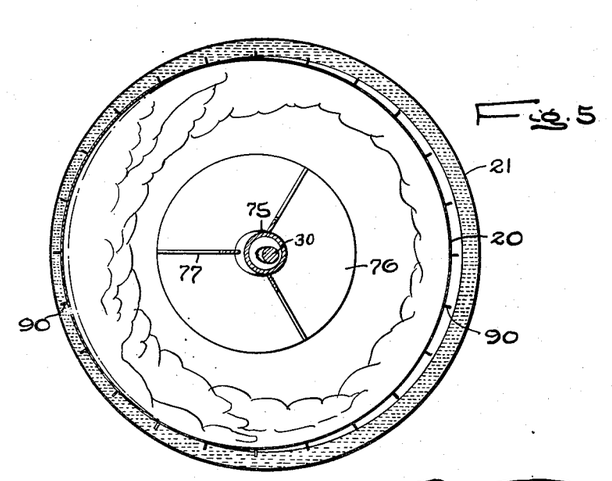
Fig. 5 is a fragmentary horizontal sectional view showing the manner in which the rotating structure is balanced when the clothes are unevenly distributed in the receptacle.

As described heretofore, the basket 21 is supported in suspended relation from a single central bearing 85, which permits limited lateral swinging of the tub about its pivot. When the load in the basket is uniformly distributed, the basket tends to rotate uniformly about a vertical axis, as shown in Fig. 4. If the load is unevenly distributed, however, the basket will swing toward the heavier side, as shown in Fig. 5, until a point of balance is attained.

The lateral swinging of the basket under the above conditions forces the balancing ring 92 into the water column, thereby displacing a corresponding amount of water at one side of the tub. This displaced water is either moved to the opposite side into the space vacated by the receding basket or discharged from the tub, depending on whether ring 92 is touching or entering the water column in its center position. In either case the weight of the spinning tub is decreased on the side toward which the basket is moved by its unbalanced load. With the ring 92 having the correct shape, the net result is that the total mass of the tub, the basket, the water and the load in the basket are automatically brought into precise balance with respect to the axis of rotation so that smooth vibrationless rotation of the assembly is insured.

Means is provided for draining off the water retained in the tub 21 for driving the basket 20, which drain means is also available for draining the tub when it is not desired to spin the water therefrom as above described. For this purpose the lower and intermediate portions of the shaft 30 are formed with an axial bore 95 opening into the tub through laterally directed ports 96. The lower end of the shaft 30 is extended through the transmission housing 43 and into a fitting 97 which has a branch 98 leading to the storage tank 27.

The drain provided by the passage 95 is normally closed by a valve member having a conical head 99 urged into seating engagement with the lower end of the shaft by means of a spring 100. The valve member is formed with a depending shank 101 which projects through a suitably bushed opening in the lower wall of the fitting 97 for engagement by a lever 102 pivotally supported on the fitting. In the present instance, a solenoid 103 is provided for rocking the lever to withdraw the valve from engagement with the shaft, thereby opening the drain. Water from the tub is therefore directed through the passage 95, fitting 97 and branch 98 to the tank 27.

In the exemplary machine the fitting 97 is formed with a second branch 104 connected with an intake 105 of the pump 28. The pump outlet in this instance is connected through an elbow fitting 106 and valve 107 with an upright pipe 108 which has its upper end positioned to direct water into the basket 20. As herein shown, the pump 28 has its shaft 109 drivingly connected with the shaft of the motor M by means of a coupling 110, whereby the pump is driven continuously when the machine is in operation.

The delivery of water from the tank to the tub is regulated by the valve 107. Thus when the valve 107 is closed the pump operates idly while the water is delivered through the pipe 108 when the valve is opened. The valve 107 may be of any suitable construction, preferably of the type normally held in closed position by a spring or the like and adapted to be opened by energization of a solenoid 111 associated therewith.

Provision is also made in the exemplary machine for supplying rinse water to the tub 21 by way of the delivery pipe 108. For this purpose hot and cold water lines 112 and 113 are extended to a mixing valve 114 suitably supported on the cabinet 23. The mixing valve may be of any suitable and well known type and is preferably provided with temperature responsive means adjustable manually by a knob 115 to regulate the ratio of the cold and hot water supplied to the tub, whereby temperature of the same is accurately controlled. Flow of water from the mixing valve to the tub is controlled by a valve 116 (Fig. 2) connected with the pipe 108 at a point above the valve 107 by means of a fitting 117. The valve 116 may be similar to the valve 107, that is, a valve of the type normally biased to a closed position and operated to an open position by a solenoid 118 associated therewith.

The washing, rinsing and extracting actions of the machine can be carried out in any desired sequence and for any desired intervals by providing an appropriate cycle controller or timer. By way of illustration I have shown a conventional type of controller arranged to provide a very simple operating cycle involving merely washing, a single rinsing and extracting.

The exemplary controller which is enclosed within a casing 120 (Fig. 1) mounted on the cabinet 23 includes an electric driving motor M1 (Fig. 7) connected through suitable speed reduction gearing (not shown) to drive a cam shaft 121 at very low speed, as for example, through an angle of ten degrees per minute or a complete revolution in thirty-six minutes. The driving connections of such timers ordinarily include an overrunning clutch or the like permitting independent manual rotation of the shaft by means of a knob 122 for changing the length of certain phases of the cycle. A pointer 123 rotatable with the knob 122 cooperates with a scale 124 to indicate the position of the cam shaft and thus the speed of the operating cycle.

In the present instance the controller is started and stopped by a switch S which is closed manually to start a cycle and opened automatically in known manner at the end of the cycle, which in this instance is represented by a single revolution of the cam shaft 121. As herein shown, the cam shaft carries six cams each having an associated electrical switch which is open when the controller is idle and which is closed for a predetermined interval in each rotative cycle of the shaft. Thus, one cam $a$ and associated switch S–1 control the circuit of the main driving motor M, cam $b$ and switch S–2 control the pump valve solenoid 111, cam $c$ and switch S–3 control the drain valve solenoid 103, cam $d$ and switch S–4 control the rinse water valve solenoid 118, cam $e$ and switch S–5 control the agitator clutch solenoid 54, and cam $f$ and switch S–6 control the spinning clutch solenoid 67.

Figure 6:
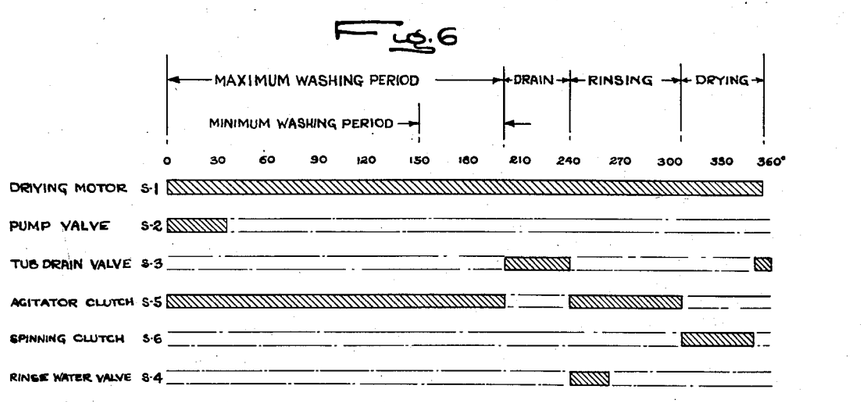
Fig. 6 is a time chart showing the sequence and duration of the various phases of a typical operating cycle.
Figure 7:
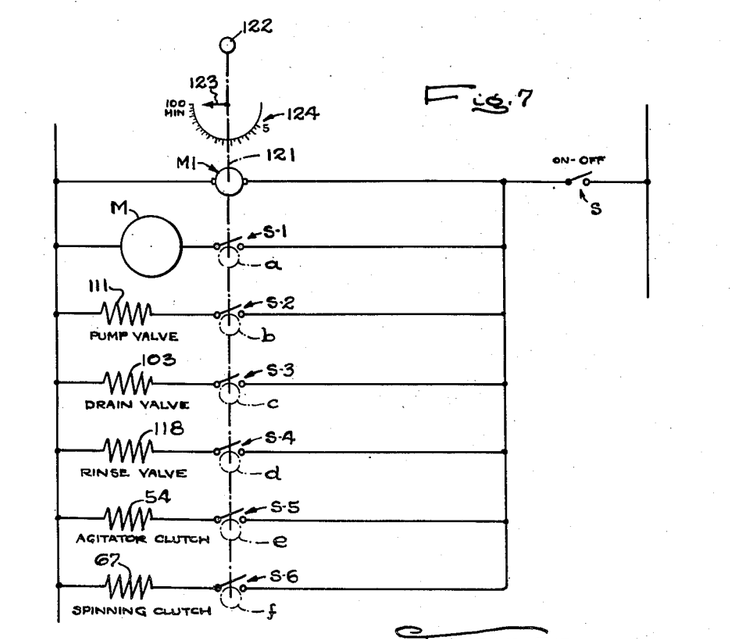
Fig. 7 is a circuit diagram of a cycle control system suitable for use with the machine shown in Figs. 1–5.

The time chart illustrated in Fig. 6 represents a typical operating cycle obtainable with the controller shown in Fig. 7. In this chart the shaded areas represent the closed intervals of the switches indicated. The chart has been laid out in degrees of rotation of the cam shaft and, in this instance, each ten degrees represents one minute of time. It will be understood, of course, that the time units may be changed by varying the speed of the cam shaft.

Assuming that the tank 27 contains a suitable quantity of washing solution such as soap and water and that the clothes to be laundered have been placed in the basket 20, a cycle is initiated by actuation of the switch S. Closure of this switch starts the timing motor M1 which drives the cam shaft 121. As the shaft leaves its normal rest position, switch S–1 is closed to start the driving motor M, switch S–2 is closed to energize the pump valve solenoid 111, and switch S–5 is closed to energize the agitator clutch solenoid 54. Motor M oscillates the shaft 30 and pump 28 draws the washing solution from the tank 27 and delivers it by way of the pipe 108 to the tub and basket. Since the tub is empty at the beginning of the cycle, the basket 20 is in its lower position with the clutch elements 78—79 disengaged. As the tub becomes filled, the basket floats upwardly until the clutch elements engage, whereupon oscillation of the basket and the clothes contained therein begins.

After a predetermined interval, switch S–2 opens allowing the pump valve 107 to close and interrupt the supply of water to the tub. The valve of course is held open long enough to fill the tube to the desired level, in this instance approximately three and one-half minutes or the time required for the cam shaft to turn through an angle of about thirty-five degrees.

The washing phase of the cycle continues with the clothes being agitated in the wash solution. In the exemplary cycle, this washing phase may extend to a maximum of twenty minutes or it may be reduced to a minimum of about five minutes by manually advancing the cam shaft. After the lapse of the washing time, switch S–5 opens to interrupt the oscillation of the clothes basket and switch S–3 closes to energize the solenoid 103 and open the drain valve 99. The wash solution is thus drained from the tub into the storage tank 27.

After an appropriate interval for draining, in this instance approximately four minutes, switch S–3 opens to allow the drain valve to close, switch S–5 closes to re-engage the agitator clutch and switch S–4 closes to energize the solenoid 118 and open the rinse water valve 116. Rinse water is delivered to the tub at a temperature determined by the setting of the mixing valve 114. In practice, it is usually desirable to supply an excess quantity of the rinse water to the tub so as to float off any scum or sediment from the clothes. In the present instance the rinse water valve is held open for approximately two and one-half minutes.

The rinsing phase of the cycle continues with agitation of the clothes for an interval of approximately six and one-half minutes. Switch S–5 is then opened to disengage the agitator clutch and switch S–6 is closed to energize the solenoid 67 for engaging the spinning clutch. Upon engagement of the latter clutch, shaft 30 begins to rotate continuously in one direction but at relatively low speed because of the relatively heavy load contained in the tub. As the speed of the tub gradually increases, the rinse water is forced out over the tub flange into the channel 87 and the drain pipe 89. The basket 20 moves downwardly as the water is discharged from the tub until the clutch elements 78—79 are disengaged. Rotation of the basket, however, continues due to the coupling provided by the vanes 90 projecting into the water column retained in the tub. The speed of the tub increases rapidly until the full spinning speed is reached, whereas the basket accelerates more slowly, thus giving the clothes an opportunity to spread uniformly around the walls of the basket. In time the speed of the basket approaches or equals that of the tub and the water is extracted from the clothes by the centrifugal force thus developed.

In the exemplary cycle, the spinning phase of the cycle is approximately four and one-half minutes and is interrupted by the opening of the switch S–6 shortly before the cam shaft completes its full revolution. Switch S–3 is again closed to reopen the drain valve so that the water retained in the tub for driving the basket may be drained away. As the cam shaft completes its revolution, the cycle is ended by the opening of the switch S, the spinning tub and basket coast to rest and the clothes may be removed from the basket ready for drying.

Figure 8:
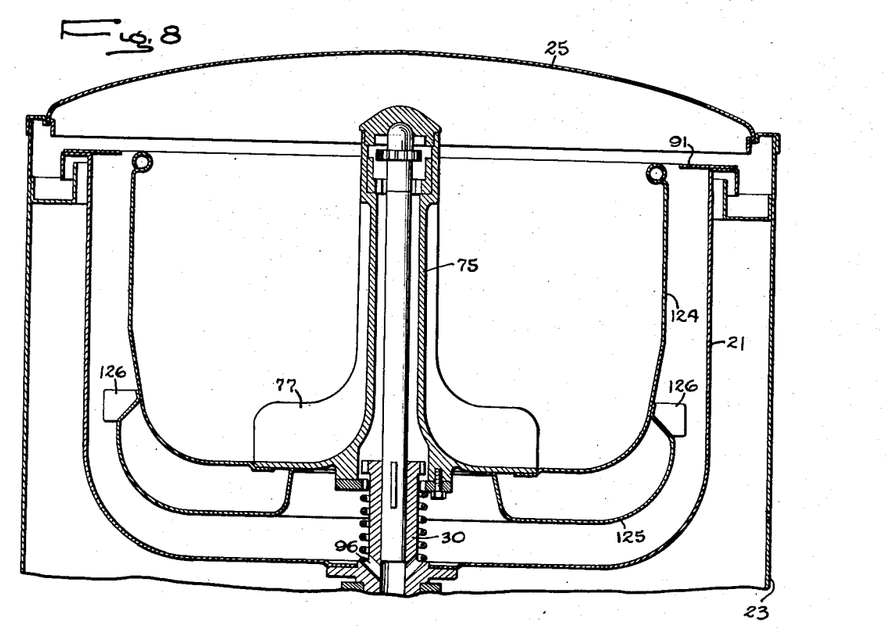
Fig. 8 is a fragmentary sectional view showing a modified form of clothes receptacle.

Fig. 8 shows a modification in which the inner receptacle or clothes basket 124 is provided with a balancing ring 125 adapted to serve additionally as a float chamber for the basket. The ring is preferably formed by a metal sheet pressed into appropriate shape to define three walls of an annular chamber and is secured to the bottom of the tub which forms the fourth wall of the chamber.

It will be observed that the outer marginal edge of the chamber forming ring 125 projects radially outwardly of the wall of the basket to enable it to coact with the water column in the same manner as described heretofore for the ring 92 while affording sufficient clearance between the basket and the column for the discharge of water from the basket. Blades or vanes 126 secured to the upper edge of the ring and projecting radially therefrom extend into the water column to provide a fluid coupling between the tub and the basket.

Fig. 9 shows another modified form of the tub and basket structure. In this instance the main drive shaft 127 is tubular throughout its entire length and has a separate agitator shaft 128 arranged coaxially therein. Drive mechanism of any preferred type, such as that heretofore described, is arranged for selectively rotating the outer shaft 127 at high speed or alternatively for oscillating the inner shaft 128. The other receptacle or tub 129 is rigidly secured to the outer shaft for rotation therewith.

In the structure illustrated, a clothes basket 130 of generally cylindrical shape is provided with an upstanding central pedestal 131 having an inturned flange 132 at its upper end rotatably seating on a bearing formed by an upwardly facing shoulder 133 on the shaft 127. The basket is thus supported for independent rotation on the shaft 127. Rotative drive for spinning the basket to extract water from the clothes therein is provided by a fluid coupling with the tub 129 similar to that heretofore described, including radially projecting vanes 134 on the basket projecting into the water column formed in the tub when the latter is rotated.

Agitation of the clothes for washing and rinsing is effected by an agitator 135 drivingly secured to the upper end of the shaft 128 which projects above the end of the shaft 127. The agitator may be of any preferred construction and is preferably removably secured to the shaft to permit convenient removal of the basket 130 from the tub 129.

To provide for automatically balancing the rotating basket and tub assembly when the load in the basket is unevenly distributed, the pedestal 131 is dimensioned to provide substantial clearance around the shaft 127 and the bearing flange 132 is not positively confined in engaging relation with the bearing 133. The basket may therefore swing laterally about the bearing as a pivot. Springs 136 interposed between a sleeve 137 on the shaft 127 and the adjacent inner surface of the pedestal yieldably retain the basket in a centered position while permitting limited swinging movement upon uneven load distribution. A balancing ring 138 secured to the basket to form an encircling annular air chamber coacts with the water column in the tub 127 to effect the balancing as before explained.

Figure 10:
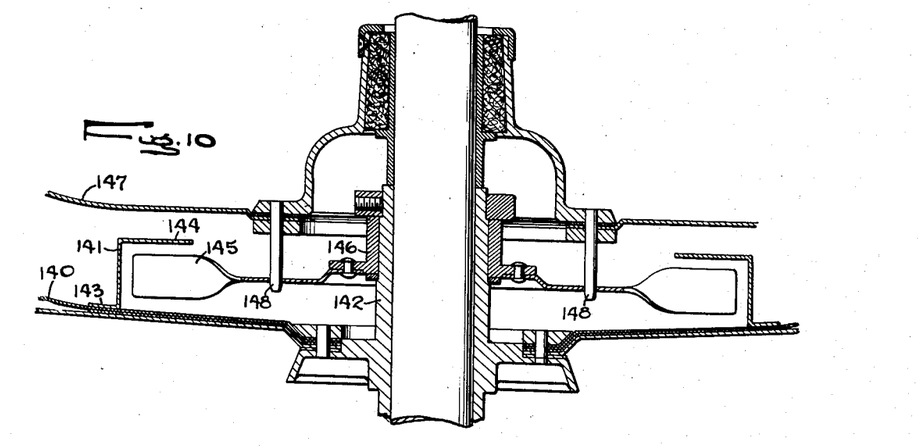
Fig. 10 is a fragmentary sectional view showing a modified form of fluid coupling for the tub and receptacle.

Fig. 10 shows a tub and basket assembly utilizing a modified form of fluid coupling which requires retention of relatively little water in the tub. To this end, the tub 140 is provided with a water-retaining ring 141 located at the bottom of the tub encircling the shaft 142 upon which the tub is mounted and in closely spaced relation thereto. The ring may comprise a circular sheet-metal band having its lower edge flanged outwardly as at 143 for attachment to the tub and its upper edge flanged inwardly as at 144. The band and upper flange thus define a partially closed annular water-retaining chamber of relatively small capacity.

The water-retaining chamber serves as a housing for a runner comprising a series of blades or paddles 145 supported at their inner ends on a hub 146 and projecting radially therefrom into the chamber. The hub 146 is rotatably supported on the shaft 142 between suitable retaining rings which hold it against movement axially of the shaft. The arrangement is such that upon rotation of the tub, the water retained by the chamber provides a coupling effective to rotate the paddles and hub 146.

In the particular structure illustrated, the basket 147 is of the float type hereinbefore described and provision is made for drivingly connecting it with the hub and paddle assembly only when in its lower position. The connecting means as herein shown comprises a series of pins 148 rigidly anchored in the bottom of the basket and projecting downwardly therefrom so as to enter between the paddles when the basket descends to its lowermost position as shown in the drawing. The basket is thus rotatable with the paddle assembly during the extracting or spinning phase of a cycle.

Figure 11:
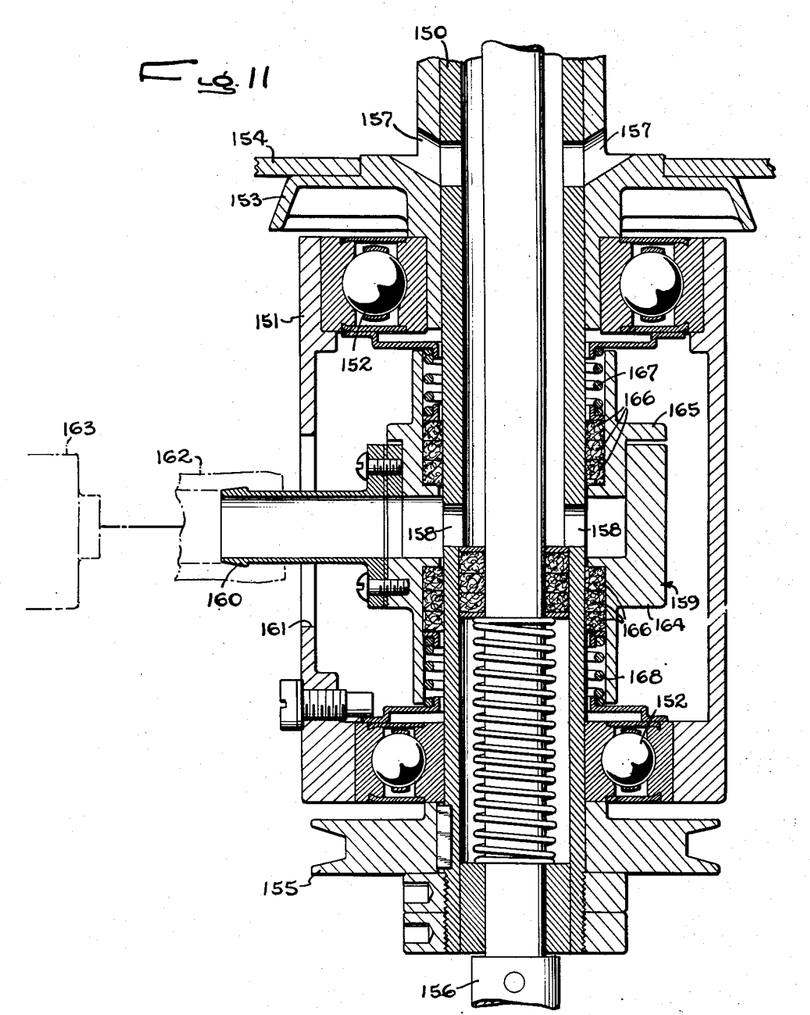
Fig. 11 is a fragmentary vertical sectional view of the drive shaft for the machine showing an alternative draining arrangement.

Fig. 11 shows a modification of the main drive shaft of the machine to provide a lateral drain outlet. The shaft indicated at 150 is rotatably supported in a bearing sleeve 151 by antifriction bearings 152 and flanged collar 153 fixed on the upper end of the shaft. This collar also provides an interconnection between the shaft and the tub 154. A pulley 155 is provided at the lower end of the shaft for connection with the driving mechanism whereby the shaft is rotated. In the particular embodiment illustrated, a separate agitator shaft 156 is employed, this shaft being mounted coaxially within the shaft 150.

Radially directed ports 157 in the shaft and collar 153 open into the interior of the tub 154 and provide for the admission of water to the shaft. Radial ports 158 in the shaft intermediate the bearings 152 provide an outlet for the same. These outlet ports open into a chamber formed within a sleeve-like fitting 159 rotatably supported on the shaft and having a tubular outlet 160 projecting radially through an opening 161 in the sleeve 151. A suitable conduit such as a length of flexible hose 162 connects the outlet tube 160 with a drain valve 163 by which the drainage of the tub is controlled.

In its preferred form the sleeve member 159 is constructed in two parts 164 and 165 mounted on the shaft for sliding movement axially thereof and having their abutting ends shaped for interfitting telescopic relation. The outer ends of the parts are counterbored for the reception of suitable packing rings 166 dimensioned to snugly embrace the shaft. Springs 167 and 168 interposed between the outermost packing rings of the respective parts and suitable washers resting on the bearings 152 urge the parts together so as to effectively prevent leakage around the shaft without interfering with shaft rotation.

I claim as my invention:

1. In a laundering machine of the class described, the combination of a tub-shaped outer receptacle having the open end thereof facing upwardly, mounting means rotatably supporting said receptacle for rotation about a substantially vertical axis, rotary driving means interconnected with said receptacle, a tub-shaped inner receptacle rotatably nested within said outer receptacle in generally coaxial relation thereto, a hollow first pedestal extending upwardly from the bottom of said inner receptacle in generally coaxial relation to said outer receptacle, a second pedestal secured to the bottom of said first receptacle and extending upwardly through said first pedestal, said inner receptacle being shiftable under the influence of gravity between a raised position and a lowered position, lifting means associated with said inner receptacle for shifting the latter to said raised position as an incident to the filling of said outer receptacle with fluid, first clutching means on said second pedestal, and second coacting clutching means on said first pedestal axially positioned thereon to clear said first clutching means when said inner receptacle is in lowered position and to have clutching engagement with said first clutching means when said inner receptacle is in raised position.

2. In a laundering machine of the class described, the combination of a tub-shaped outer receptacle having the open end thereof facing upwardly, mounting means rotatably supporting said receptacle for rotation about a substantially vertical axis, rotary driving means interconnected with said receptacle, a tub-shaped inner receptacle rotatably nested within said outer receptacle in generally coaxial relation thereto, a hollow first pedestal extending upwardly from the bottom of said inner receptacle in generally coaxial relation to said outer receptacle, a second pedestal secured to the bottom of said first receptacle and extending upwardly through said first pedestal, said inner receptacle being shiftable between a raised position and a lowered position, a downwardly facing swivel bearing member on the upper end of said first pedestal, a coacting bearing member on the upper end of said second pedestal positioned to engage said first mentioned bearing member when said inner receptacle is in lowered position to form a swivel support for said inner receptacle, lifting means associated with said inner receptacle for shifting the latter to said raised position as an incident to the filling of said outer receptacle with fluid, first clutching means on said second pedestal, and second coacting clutching means on said first pedestal axially positioned thereon to clear said first clutching means when said inner receptacle is in lowered position and to have clutching engagement with said first clutching means when said inner receptacle is in raised position.

3. In a laundering machine of the class described, the combination of a tub-shaped outer receptacle having the open end thereof facing upwardly, mounting means rotatably supporting said receptacle for rotation about a substantially vertical axis, rotary driving means interconnected with said receptacle, an inner receptacle generally similar in shape to said outer receptacle and nested therein in generally coaxial relation thereto, a hollow first pedestal extending upwardly from the bottom of said inner receptacle in generally coaxial relation to said outer receptacle, a second pedestal secured to the bottom of said first receptacle and extending upwardly through said first pedestal, said inner receptacle and said first pedestal being shiftable under the influence of gravity between a raised position and a lowered position relative to said outer receptacle, means fixed to the lower end of said inner receptacle and defining a fluid-tight air chamber adapted to shift said inner receptacle to said raised position as an incident to the filling of said outer receptacle with fluid, first clutching means on said second pedestal, and second coacting clutching means on said first pedestal axially positioned thereon to clear said first clutching means when said inner receptacle is in lowered position and to have clutching engagement with said first clutching means when said inner receptacle is in raised position, said inner receptacle thus being automatically shiftable to engage said two clutch means as an incident to filling of said outer receptacle and automatically shiftable to disengage said two clutch means as an incident to the discharge of water from said outer receptacle induced by rotation of the latter.

4. In a laundering machine of the class described, the combination of a tub-shaped outer receptacle having the open end thereof facing upwardly, mounting means rotatably supporting said receptacle for rotation about a substantially vertical axis, rotary driving means interconnected with said receptacle, an annular flange disposed about the upper edge of said receptacle and extending inward therefrom, a tub-shaped inner receptacle rotatably nested within said outer receptacle in generally coaxial relation thereto, a hollow first pedestal extending upwardly from the bottom of said inner receptacle in generally coaxial relation to said outer receptacle, a second pedestal extending through the bottom of said first receptacle and projecting upwardly into said first pedestal, said inner receptacle and said first pedestal thereon being shiftable between a raised position and a lowered position relative to said outer receptacle, lifting means associated with said inner receptacle for shifting the latter to a raised position as an incident to the filling of said outer receptacle with fluid, first clutching means on said second pedestal, second coating clutching means on said first pedestal axially positioned thereon to have clutching engagement with said first clutching means when said inner receptacle is in said raised position and to clear said first clutching means when said inner receptacle is in lowered position, and a plurality of water vanes fixed to the outer cylindrical sides of said inner receptacle and extending radially therefrom into underlying relation to said outer tub flange to be rotatably driven by a cylindrical column of water forced against the sides of said outer receptacle upon rotation of the latter.

5. In a laundering machine of the class described, the combination of a tub-shaped outer receptacle having an upwardly facing open end, mounting means rotatably supporting said receptacle for rotation about a substantially vertical axis, rotary driving means interconnected with said receptacle, an inner receptacle conforming generally in shape to said outer receptacle and rotatably nested therein, rotary mounting means for said inner receptacle permitting shifting movement thereof between a lowered position and a raised position relative to said outer receptacle, said inner receptacle, when in said lowered position, being freely rotatable relative to said outer receptacle, coacting clutching means including a first clutching element interconnected with said outer receptacle and a second clutching element interconnected with said inner receptacle, lifting means interconnected with said inner receptacle and operable automatically as an incident to the filling of said outer receptacle to shift said inner receptacle to said raised position, said first and second clutching elements being arranged to be mutually engaged as an incident to vertical shifting movement of said inner receptacle whereby the latter is positively clutched to said outer receptacle for rotation therewith, an annular flange extending radially inward from the upright wall of said outer receptacle for retaining a cylindrical column of water on said wall upon unidirectional rotation of said outer receptacle, said inner receptacle being automatically shiftable into said lowered position to disengage said clutch members as an incident to the spilling of fluid from said outer receptacle upon rotation thereof, and means extending radially outward from said inner receptacle into underlying relation with said flange to rotatably drive said inner receptacle from a column of water entrapped by said flange.

6. In a laundering machine of the class described, the combination of a tub-shaped outer receptacle having an upwardly facing open end, mounting means rotatably supporting said receptacle for rotation about a substantially vertical axis, rotary driving means interconnected with said receptacle, a tub-shaped inner receptacle having a perforated generally cylindrical side wall and disposed substantially entirely within said first receptacle in nested relation thereto, a hollow first pedestal extending upwardly from the bottom of said inner receptacle in generally coaxial relation to said outer receptacle, a second pedestal extending upwardly from the bottom of the first receptacle into said first pedestal, coacting bearing means on upper ends of said respective pedestals arranged to provide a swivel support for said inner receptacle, an arcuate retaining flange extending radially inward from the upper edge of said outer receptacle for retaining a cylindrical column of water on the cylindrical wall of said outer receptacle upon rotation of the latter, water vanes fixed to the upright wall of said inner receptacle and extending radially outward therefrom into underlying relation with said flange to form driven elements of a fluid coupling between said inner and outer receptacles upon centrifugal forcing of water into the radial spacing between the opposed side walls of the receptacles, and an annular float fixed to the lower end of said inner receptacle in position to extend under said outer receptacle flange upon pivotal swinging movement of said inner receptacle about said swivel support.

7. In a laundering machine of the class described, the combination of a tub-shaped outer receptacle having an upwardly facing open end, mounting means rotatably supporting said receptacle for rotation about a substantially vertical axis, rotary driving means interconnected with said receptacle, a tub-shaped inner receptacle structurally separate from said outer receptacle, said inner receptacle being nested within said outer receptacle to form therewith thin spacings between the contiguous top and bottom walls of the receptacles, first bearing means mounted on said inner receptacle, second bearing means supported from said mounting means for coaction with said second bearing means to support said inner receptacle for free rotation relative to said outer receptacle, an arcuate retaining flange extending radially inward from the vertical side wall of said outer receptacle for retaining a cylindrical column of water on said side wall upon rotation of the outer receptacle, and water vanes fixed to the upright wall of said inner receptacle and extending radially outward therefrom into underlying relation with said flange to form driven elements of a fluid coupling between said inner and outer receptacles upon centrifugal forcing of water into the radial spacing between the opposed side walls of the receptacles as an incident to rotation of said outer receptacle.

8. Laundering machine structure as set forth in claim 1 having an oscillatory driving means interconnected with the inner pedestal effective to oscillate the inner receptacle, and means in the inner receptacle for agitating the contents thereof during such oscillation.

9. In a laundering machine of the class described, the combination of a tub-shaped outer receptacle having an upwardly facing open end, mounting means rotatably supporting said receptacle for rotation about a substantially vertical axis, rotary driving means interconnected with said receptacle, an inner receptacle conforming generally in shape to said outer receptacle and being structurally independent thereof, said inner receptacle being nested within said outer receptacle, rotary bearing means supporting said inner receptacle for rotation and free vertical movement relative to said outer receptacle, said inner receptacle, when in lowered position, being freely rotatable on said bearing means relative to said outer receptacle, coacting clutching means including a first clutching element interconnected with said outer receptacle and a second clutching element interconnected with said inner receptacle, a float mounted on said inner receptacle and operable automatically as an incident to the filling of said outer receptacle to shift said inner receptacle to a raised position, said first and second clutching elements being arranged to be mutually engaged as an incident to vertical shifting movement of said inner receptacle whereby the latter is positively clutched to said outer receptacle for rotation therewith, an annular flange extending radially inward from the upright wall of said outer receptacle for retaining a cylindrical column of water on said wall upon unidirectional rotation of said outer receptacle, said inner receptacle being automatically shiftable into said lowered position to disengage said clutch members as an incident to the spilling of fluid from said outer receptacle upon rotation thereof, and means extending radially outward from said inner receptacle to rotatably drive said inner receptacle from a column of water entrapped by said flange.

10. In a laundering machine, the combination of a tub-shaped outer receptacle, mounting means supporting said receptacle for rotation about a generally vertical axis, rotary driving means operatively connected to said receptacle, a tub-shaped inner receptacle nested within said outer receptacle, second mounting means supporting said inner receptacle for rotation relative to said outer receptacle about an axis common thereto, fluid retaining means on said outer receptacle for containing an annular mass of rotating fluid upon rotation of the outer receptacle, and driving vanes interconnected with said inner receptacle and extending radially from the axis thereof into coacting relation with said fluid retaining means to form therewith a fluid coupling between said outer and inner receptacles.

BERTHOLD R. THIELE.

(References on following page)

References Cited in the file of this patent

UNITED STATES PATENTS

| Number | Name | Date |
|---|---|---|
| 974,591 | Patterson | Nov. 1, 1910 |
| 1,521,858 | Bock | Jan. 6, 1925 |
| 1,757,585 | Orr | May 6, 1930 |
| 1,760,775 | Peters | May 27, 1930 |
| 1,772,863 | Green | Aug. 12, 1930 |
| 2,109,620 | Kirby | Mar. 1, 1938 |
| 2,259,208 | Hutchison | Oct. 14, 1941 |
| 2,298,095 | | |
| 2,298,905 | Dunham | Oct. 6, 1942 |
| 2,302,012 | Skinner | Oct. 13, 1942 |
| 2,313,644 | Dyer | Nov. 17, 1942 |
| 2,315,130 | Hvid | Mar. 9, 1943 |
| 2,361,767 | Peterson | Mar. 30, 1943 |
| 2,366,236 | Hays | Oct. 31, 1944 |
| 2,375,635 | Clark | Jan. 2, 1945 |
| 2,471,217 | Dyer | May 8, 1945 |
| 2,513,844 | Johnson | May 24, 1949 |
| | Castner et al. | July 4, 1950 |